US009638988B2

(12) United States Patent
Cobb et al.

(10) Patent No.: US 9,638,988 B2
(45) Date of Patent: May 2, 2017

(54) LIGHT MULTIPLEXER WITH COLOR COMBINING ELEMENT

(71) Applicant: Corning Incorporated, Corning, NY (US)

(72) Inventors: Joshua Monroe Cobb, Victor, NY (US); John Weston Frankovich, Fairport, NY (US)

(73) Assignee: Corning Incorporated, Corning, NY (US)

( * ) Notice: Subject to any disclaimer, the term of this patent is extended or adjusted under 35 U.S.C. 154(b) by 17 days.

(21) Appl. No.: 14/564,154

(22) Filed: Dec. 9, 2014

(65) Prior Publication Data

US 2015/0168817 A1    Jun. 18, 2015

Related U.S. Application Data

(60) Provisional application No. 61/915,126, filed on Dec. 12, 2013.

(51) Int. Cl.
*G03B 21/14*    (2006.01)
*H04N 9/31*     (2006.01)
(Continued)

(52) U.S. Cl.
CPC .......... *G03B 21/14* (2013.01); *G02B 27/102* (2013.01); *G02B 27/145* (2013.01);
(Continued)

(58) Field of Classification Search
CPC .. G02B 27/10; G02B 27/1006; G02B 27/141; G02B 27/145; H04N 9/3161;
(Continued)

(56) References Cited

U.S. PATENT DOCUMENTS 3,922,069 A    11/1975    Kishikawa et al.
4,284,323 A     8/1981    Jankowitz
(Continued)

FOREIGN PATENT DOCUMENTS

EP    2151705     2/2010
WO    97/31442    8/1997
(Continued)

OTHER PUBLICATIONS

International Search Report issue in connection with corresponding PCT application No. PCT/US2014/069499, Mar. 6, 2015.

*Primary Examiner* — William C Dowling
(74) *Attorney, Agent, or Firm* — Kevin L. Bray

(57) ABSTRACT

A light multiplexing system includes a color combining element and first, second, and third color channels. Each color channel includes a light source that directs light of a corresponding first, second, or third wavelength band, respectively, toward the color combining element. The color combining element includes first and second windows. The first and second windows are made of a solid transparent material and include, collectively, three coated surfaces. The surfaces may be non-contiguous. A first coated surface receives light of the first, second and third wavelength bands. The first coated surface reflects the light of the first wavelength band and transmits the light of the second and third wavelength bands. A second coated surface receives light of the second and third wavelength bands transmitted by the first coated surface. The second coated surface reflects the light of second wavelength band and transmits the light of the third wavelength band. The third coated surface receives the light of the third wavelength band transmitted by the second coated surface and reflects it. The reflected first, second, and third wavelength bands exit the (Continued)

first surface of the color combining element as a coaxial beam.

27 Claims, 10 Drawing Sheets

(51) Int. Cl.
    *G02B 27/10*         (2006.01)
    *G02B 27/14*         (2006.01)
    *G03B 21/20*         (2006.01)

(52) U.S. Cl.
    CPC ....... *G02B 27/148* (2013.01); *G03B 21/2013* (2013.01); *G03B 21/2066* (2013.01); *H04N 9/3141* (2013.01); *G03B 21/2033* (2013.01)

(58) Field of Classification Search
    CPC .. H04N 9/3164; H04N 9/3108; H04N 9/3111; G03B 21/003; G03B 21/006; G03B 21/008
    USPC ........... 353/31, 33, 34, 37, 81; 359/634, 629
    See application file for complete search history.

(56) References Cited

U.S. PATENT DOCUMENTS

| | | |
|---|---|---|
| 4,660,932 A | 4/1987 | Eckbreth |
| 4,806,750 A * | 2/1989 | Vincent ................. G01J 3/2803 250/226 |
| 4,870,268 A | 9/1989 | Vincent et al. |
| 4,913,528 A | 4/1990 | Hasegawa |
| 5,005,935 A | 4/1991 | Kunikane et al. |
| 5,541,771 A | 7/1996 | Bohn |
| 5,920,347 A | 7/1999 | Aoki |
| 5,999,509 A | 12/1999 | Sugiura et al. |
| 6,111,674 A * | 8/2000 | Bhagavatula ...... G02B 6/12007 398/1 |
| 6,407,974 B1 | 6/2002 | Kim et al. |
| 6,496,453 B2 | 12/2002 | Asada et al. |
| 6,665,063 B2 | 12/2003 | Jamieson et al. |
| 7,059,726 B2 | 6/2006 | Engle |
| 7,167,315 B2 * | 1/2007 | Watson ................. H04N 9/3105 348/E9.026 |
| 7,261,423 B2 * | 8/2007 | Magarill .............. H04N 9/3105 348/E9.027 |
| 7,633,562 B2 | 12/2009 | Chilla et al. |
| 8,376,551 B2 | 2/2013 | Cobb |
| 2002/0126288 A1 | 9/2002 | Friberg et al. |
| 2004/0105078 A1 | 6/2004 | Akiya |
| 2007/0107769 A1 | 5/2007 | Cobb et al. |
| 2007/0165184 A1 | 7/2007 | Kasazumi et al. |
| 2010/0033685 A1 * | 2/2010 | Seo .......................... G02B 5/04 353/31 |
| 2011/0205501 A1 | 8/2011 | Cobb |
| 2011/0249197 A1 | 10/2011 | Sprowl et al. |
| 2011/0249240 A1 | 10/2011 | Takahashi et al. |
| 2013/0169893 A1 * | 7/2013 | Ouderkirk .............. G03B 21/14 349/8 |

FOREIGN PATENT DOCUMENTS

| | | |
|---|---|---|
| WO | 2005/104566 | 11/2005 |
| WO | 2007/046710 | 4/2007 |

* cited by examiner

LIGHT MULTIPLEXER WITH COLOR COMBINING ELEMENT

This application claims the benefit of priority under 35 U.S.C. §119 of U.S. Provisional Application Ser. No. 61/915,126 filed on Dec. 12, 2013, the content of which is relied upon and incorporated herein by reference in its entirety.

FIELD

This disclosure relates to a light multiplexer for color imaging, projection systems and other applications. More particularly, this disclosure relates to an apparatus and method for combining light from two or more solid-state light sources of different wavelengths to form a coaxial multicolor beam for delivery to an optical system configured for projection or imaging.

BACKGROUND

Electronic imaging and projection systems typically include several color channels, each of which provides light of a different spectral band (e.g. red, green, and blue). Light from each spectral band constitutes a color component of the intended image. The component color images are mixed (combined) to form a composite multicolor image. Different techniques may be used to mix the component color images. For large-scale systems, separate modulation and projection optics are typically used for each component color image and the component color images are mixed through convergence of the component color images onto a screen or other display surface by focusing optics. For compact and portable systems, however, it is often preferred to combine component color images through coaxial mixing. With coaxial mixing, the component color images originating from each color channel are combined and merged onto a common optical axis before delivery to a screen or display surface. Coaxial mixing of component color images conserves space and cost by using one set of projection optics for the different color channels and through sharing of modulation and optical components by the different color channels.

Early electronic imaging systems employed lamps and other polychromatic light sources to provide the colored light of each color channel. Several different light-mixing systems were developed to combine component color images in the early systems (e.g. complex prism arrangements adapted from color television camera optics). With the advent of more powerful and more nearly monochromatic light sources (e.g. light emitting diodes (LEDs) and lasers), it became possible to reduce the size and cost of color mixing components, as well as to improve color gamut, optical efficiency, and overall performance of the imaging system. For color mixing, various arrangements of composite prisms and dichroic coatings were developed for use in projectors and similar imaging systems. Among the more familiar solutions used with earlier electronic imaging systems are X-cubes or X-prisms (shown in FIG. 1A), and related dichroic optical elements, and Philips prisms (shown in FIG. 1B). Non-prism solutions include sets of angled dichroic plates, such as those as proposed in U.S. Pat. No. 6,676,260 (Cobb et al.) entitled "Projection Apparatus Using Spatial Light Modulator with Relay Lens and Dichroic Combiner."

Referring to FIG. 1A, an X-cube 10 is a composite prism, formed from four separate prism elements 10a, 10b, 10c, and 10d, as shown in inset E1, that are coated and then glued together to form a single color combiner element. The X-cube combines light from three solid-state light sources 14r, 14g, and 14b, such as laser diodes, emitting red, green, and blue light respectively. As assembled, X-cube 10 has two inner crossed dichroic interfaces 12a and 12b that are treated to selectively reflect and transmit different wavelengths. Dichroic interface 12a reflects blue wavelengths and transmits green and red wavelengths. Dichroic interface 12b, contiguous to dichroic interface 12a so that the two interfaces intersect along a line through the center of the X-cube, reflects red wavelengths and transmits green and blue wavelengths. The line of intersection of the dichroic surfaces is orthogonal to the plane of the drawing as X-cube 10 is represented in FIG. 1A. The colors are combined onto an optical axis OA, shown with separate color paths for clarity in FIG. 1A, but coaxial in practice.

The Philips prism 70, shown in FIG. 1B, is a more complex composite prism that is used for combining colors. Philips prism 70 is formed from three separate prisms, prism elements 70a, 70b, and 70c, and includes an air gap 72. An arrangement of dichroic surfaces at oblique angles directs light from solid-state light sources 14r, 14g, and 14b onto optical axis OA.

Dichroic surfaces are formed from stacked layers of ultra-thin coatings of various dielectric materials and can be formulated to provide selective reflection and transmission for light of various wavelengths. In the X-cube and Philips prism devices, and other related spectral combiners or separators, various types of dichroic coatings provide the color-selective mechanism that allows light to be spectrally re-combined or separated in a highly controlled manner.

Small, hand-held projectors and various types of embedded or accessory projectors typically use an arrangement of dichroic surfaces for mixing red, green, and blue laser light onto a single optical axis. These devices then rapidly scan the resulting light onto a display surface. To minimize battery usage and heat generation, these devices form each pixel by directly modulating each of the lasers, thereby producing only the light that is used to form the image itself. These projectors form an image by generating successive scanned lines of pixels that are then directed to the display surface.

While hand-held projection devices achieve good results using conventional color combination techniques, a number of problems remain. One problem with conventional color combination using dichroic surfaces relates to incident angles. Dichroic coatings reflect and transmit light as a function of incident angle and wavelength. As the incident angle varies, the wavelength of light that is transmitted or reflected also changes. For light that is incident at low angles (angles close to normal), the variation in response over small ranges of incidence angle or wavelength can be very low or negligible. For light incident at larger angles, however, variation in response over a range of angles can be pronounced, compromising dichroic coating performance. These coatings work best at small incidence angles, relative to normal, and it can be expensive and difficult to design and fabricate a dichroic coating that gives uniform results with incident light at large angles or over a wide range of angles. Where a dichroic coating must accept light over a large range of angles, perceptible color non-uniformities can easily result.

Other drawbacks of existing color combiners relate to the number of surfaces upon which the light is incident, whether it reflects from or transmits through the surface. Each surface of incidence represents an efficiency loss and leads to a reduction in brightness. In addition, each reflection of light from or transmission of light through a dichroic surface causes some loss, due to imperfect dichroic performance. Contrast is also compromised when light encounters a surface (whether coated or not) due to leakage. In the X-cube 10 in FIG. 1A, each of the light beams is incident on at least three surfaces and in the Philips prism 70 in FIG. 1B, each of the light beams is incident on at least four surfaces. The high number of surfaces compromises the performance of the X-cube and Philips prism devices for color mixing.

Another consideration for dichroic coatings relates to reflection and transmission of polarized light. As incident angles for light on the dichroic surface become larger, the differential in reflection efficiency for different polarization states becomes increasingly pronounced. Moreover, when incident polarized light originates from multiple laser diode sources, the unique polarization characteristics of the different laser diodes must be taken into account. One or more phase retarders can be added to the different color channels, but only at the expense of added cost and complexity. The task of designing and fabricating dichroic coatings that allow combinations of laser light of different wavelengths but the same polarization presents a considerable challenge.

A further complication in the mixing of colors provided by laser sources relates to the dimensional characteristics of the laser beams. The cross-sectional shape of many solid state laser beams is anamorphic: the beam cross-sections are more elliptical in shape than circular and the degree of elliptical distortion typically varies from one color to the next. This makes it difficult to form uniformly sized pixels from three component colors and leads to a degradation in color quality.

Cost is another concern with conventional color mixers. As FIGS. 1A and 1B show, conventional devices for color mixing include complex arrangements of dichroic surfaces and prism elements. A number of fabrication and precision assembly operations are required for their implementation. In conventional manufacture, two or more separate prism elements are formed, dichroic coatings are applied to one or more outer surfaces of the prism elements and two or more prism elements are then glued together, or otherwise joined in a precise geometric arrangement. In a typical prism assembly, one or more dichroic coatings are in the interior of the color combiner, surrounded by glass or other transparent material that forms the different prism elements. Color mixing performance can be compromised by coatings tolerances, slight misalignments in prism positioning, air gaps, surface imperfections, and other factors.

There remains a need for a color mixing solution for solid-state light sources that minimizes cost, minimizes the number of surfaces upon which light from different color channels are incident, reduces angles of incidence, and improves polarization response.

SUMMARY

The present invention provides a light multiplexing system for mixing spectral wavelength bands (colors). The light multiplexing system includes a color combining element and two or more color channels. The color channels include a light source that produces a beam of light that includes a particular spectral wavelength band (color). Each color channel produces a beam of light that includes a different spectral wavelength band and directs the beam of light to the color combining element. The color combining element receives the beams of light from two or more color channels and combines them to form an output beam. In one embodiment, the colors originating from the two or more color channels are mixed by the color combining element to produce a coaxial output beam. The coaxial output beam may include two or more colors, or three or more colors, or four or more colors.

The color-combining element includes two pieces of solid material. Each solid material is transparent over the spectral wavelength band associated with at least one of the color channels. The solid transparent material may be glass or plastic. The two solid transparent materials may be the same or different composition, the same or different size, or the same or different shape. Each piece of solid transparent material includes one or more coated surfaces and at least one of the pieces of solid transparent material includes two or more coated surfaces. The coatings disposed on the surfaces may include dichroic materials. Each coating is selected to selectively reflect the wavelength band originating from a different color channel. A different wavelength band reflects from each of the coated surfaces and the reflected beams are mixed to form the output beam. The coatings may include metallic coatings.

The light multiplexing system may optionally include optics for projecting or forming an image from the output beam.

In one embodiment, the present invention extends to:
A light multiplexing system comprising:
a color-combining element, said color-combining element comprising:
  a first piece of solid transparent material, said first piece of solid transparent material having a first surface and a second surface;
  a second piece of solid transparent material, said second piece of solid transparent material having a third surface and a fourth surface;
  a first coating disposed on said first surface;
  a second coating disposed on said second surface or said third surface; and
  a third coating disposed on said fourth surface;
a first color channel having a first light source, said first light source directing a first beam of light onto said first coating, said first beam of light including a first wavelength band;
a second color channel having a second light source, said second light source directing a second beam of light onto said first coating, said second beam of light including a second wavelength band and being parallel to said first beam of light;
a third color channel having a third light source, said third light source directing a third beam of light onto said first coating, said third beam of light including a third wavelength band and being parallel to said second beam of light;
wherein said first coating reflects said first wavelength band and transmits said second wavelength band and said third wavelength band;
wherein said second coating reflects said second wavelength band and transmits said third wavelength band; and
wherein said third coating reflects said third wavelength band.

It is a feature of the light multiplexing system of the present invention that it employs a color combining element that includes at least two pieces of one or more transmissive solid optical materials, having appropriate coatings on three or more external surfaces, to perform light mixing or color combination. Light is preferably incident only on surfaces of the color combining element having a dichroic coating disposed thereon.

It is an advantage of the present invention that it allows color combination onto a single optical axis from three or more color sources with low incident angles on dichroic surfaces.

It is a further advantage of the present invention that it allows combination of three or more colors having the same orientation of polarization transmission axes.

These and other aspects, objects, features and advantages of the present invention will be more clearly understood and appreciated from a review of the following detailed description of the preferred embodiments and appended claims, and by reference to the accompanying drawings.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION

Figure 1A:
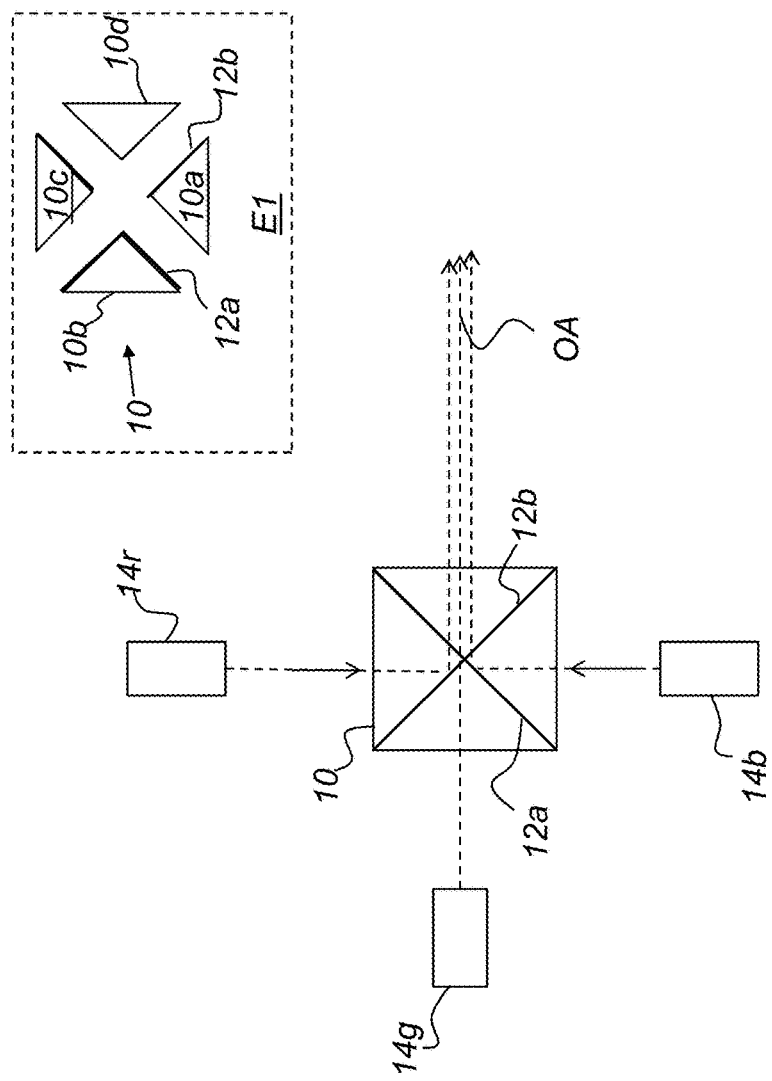
FIG. 1A is a schematic diagram showing the operation of dichroic interfaces within an X-prism used as a color combiner.
Figure 1B:
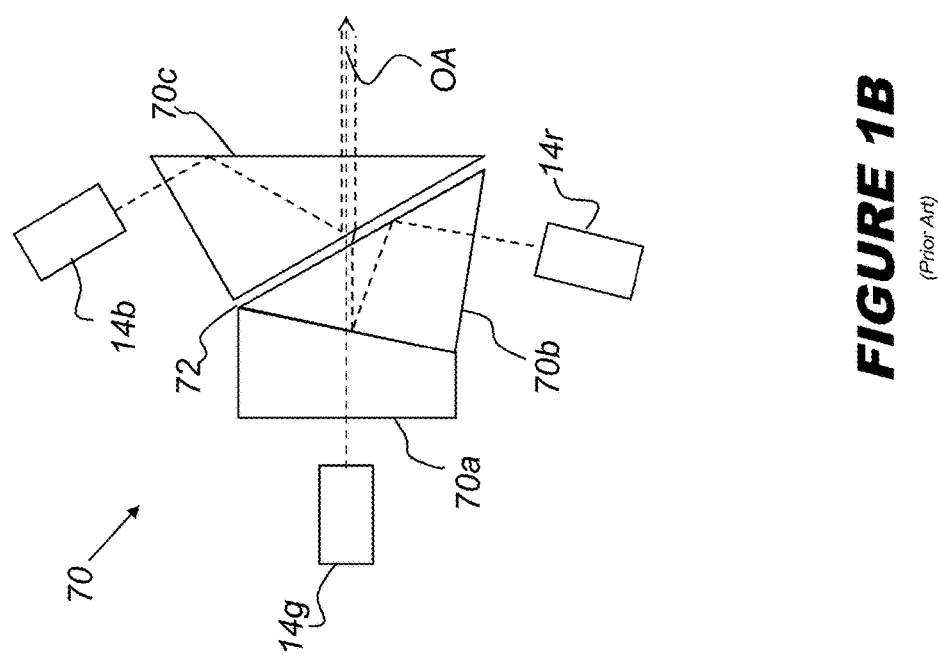
FIG. 1B is a schematic diagram showing the operation of dichroic interfaces within a Philips prism used as a color combiner

It is to be understood that elements not specifically shown or described may take various forms well known to those skilled in the art. For example, conventional prism elements and other optical components are formed from a block of suitable glass substrate, a transparent plastic, or other generally transparent solid material that has the desired index of refraction and other optical characteristics needed in an application. Dichroic coating formulations and their design and customization are well known to those skilled in the coatings art. Reflective metallic coatings are also well known to those skilled in the coatings art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships, function, or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted.

Where they are used, the terms "first", "second", and so on, do not necessarily denote any ordinal or priority relation, but may be simply used to more clearly distinguish one element from another. The term "contiguous" has its conventional meaning as touching or sharing one or more boundaries. Two surfaces are non-contiguous where they do not come into direct contact with each other.

Light is considered to be incident on a surface when it is either reflected from that surface or when it transits, or passes through, the surface.

The term "oblique" describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, parallel beams are parallel to within +/−2 degrees.

The terms "color" and "wavelength band" are generally synonymous as used in the context of the present disclosure. A light source may be referred to by its general color (such as red) rather than by its peak output wavelength (such as 635 nm) or its wavelength band (such as 630-640 nm). In the context of the present disclosure, different colors or wavelength bands are considered to be distinct and essentially non-overlapping.

The term "direct laser modulation" applies to embodiments of projection or imaging systems that form each pixel of an image as a combination of laser light signals, so that the image-forming lasers are rapidly switched on and off and their relative output power controlled for each individual pixel of an image. This form of light modulation is used in conventional hand-held projectors, for example, and offers the advantage of low power consumption since only the light that is needed for any particular pixel needs to be generated. Alternative methods for image forming include methods that direct light to a spatial light modulator, such as a digital micromirror array, a liquid crystal device (LCD) (such as a Liquid Crystal on Silicon (LCoS) device), or a linear array of electromechanical grating devices used with a scanner. Embodiments of the light multiplexing system of the present disclosure can be used to support image forming methods of the direct laser modulation type, in which a scanner may be actuated to serve as a light modulator component, or those that use a spatial light modulator that may be actuated to form composite color images using light of sequential colors, such as red, green, and blue.

The term "prism" or "prism element" is used herein, as it is understood in optics, to refer to a transparent optical element that is generally in the form of an n-sided polyhedron with flat surfaces upon which light is incident and that is formed from a transparent, solid material that refracts light. It is understood that, in terms of shape and surface outline, the optical understanding of what constitutes a prism is less restrictive than the formal geometric definition of a prism. A composite prism, such as the X-prism and Philips prism previously described, is an assembled prism formed from two or more prism elements, each of which is separately fabricated and coated, then glued together or otherwise arranged, joined or mounted to provide a color combining function.

In order to better understand how the color combining arrangement of the present invention operates, it is first useful to review the conventional color combining operation for a hand-held projector that uses direct laser modulation, as taught, for example, in U.S. Pat. No. 7,167,315 entitled "Apparatus and Method for Combining Multiple Electromagnetic Beams Into a Composite Beam" to Watson et al. and as shown in the schematic diagram of FIG. 2. A color combining element 20 is a composite prism, formed from prism elements 20a, 20b, and 20c that are separately fabricated and treated, then bonded together using an optical adhesive. Color combining element 20 has two internal, planar dichroic interfaces 22a and 22b that are on parallel planes. Dichroic interface 22a reflects blue wavelengths and transmits green wavelengths. Dichroic interface 22b reflects red wavelengths and transmits green and blue wavelengths. A collimating lens 64 is typically provided in each color channel. The colors are combined onto optical axis OA, again shown with separate color paths for clarity in FIG. 2, but coaxial in practice.

Figure 2:
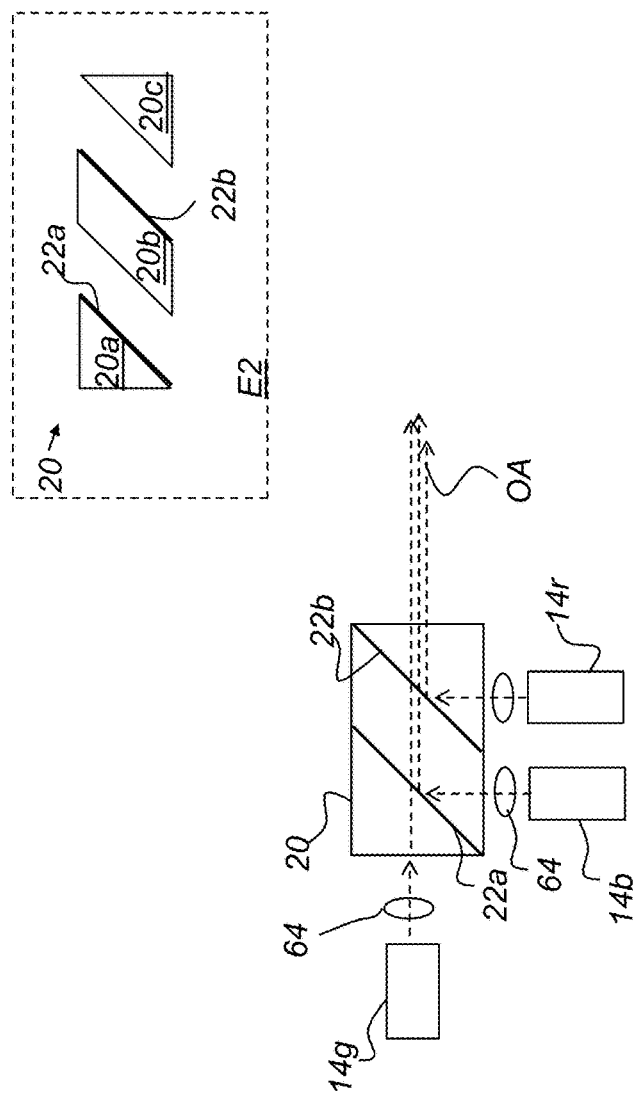
FIG. 2 is a schematic diagram that shows the operation of a color combiner for a conventional pico-projector apparatus.

Among problems with the conventional approach shown in FIG. 2 are relatively large angles of incidence for light from solid-state light sources 14r, 14g, and 14b. Light from light source 14r is incident on one dichroic interface 22b at 45 degrees. Light from light source 14b is incident on dichroic interface 22a at 45 degrees and is then incident on dichroic interface 22b at 45 degrees. Light from light source 14g is also incident on both dichroic interfaces 22a and 22b at 45 degrees. With incident light at a range about these angles, there is some loss of efficiency at each interface. In addition, anti-reflection (AR) coatings must be provided on the otherwise uncoated surfaces that receive incident light, adding cost and complexity to the fabrication of color combining element 20.

Another problem with the use of color combining element 20 in FIG. 2 relates to the number of surfaces upon which the reflected and transiting light is incident. Light from light source 14r is incident on three surfaces. Light beams from light sources 14b and 14g are incident on four surfaces. As noted previously, there is some loss of efficiency at each incident surface, whether the surface is coated or non-coated. Further performance problems with this conventional approach relate to polarization and to the generally anamorphic beam shape provided by laser sources, as described subsequently.

Yet another problem with the conventional solution for color combining element 20 shown in FIG. 2 relates to fabrication. Manufacture of this device requires both dichroic coating processing and an intricate assembly and alignment procedure. Inset E2 shows how color combining element 20 is fabricated from prism elements 20a, 20b, and 20c that are glued together to provide dichroic interfaces 22a and 22b embedded within the composite prism structure.

The present invention provides a light multiplexing system for mixing beams of light originating from different light channels. Each beam of light includes a spectral wavelength band. The beam of light or spectral wavelength band may be referred to herein as a color and the light multiplexing system may be said to mix or combine colors. The light channels that provide the beams of light may be referred to herein as color channels. The light multiplexing system includes a color combining element and two or more color channels. The color channels include a light source that produces a beam of light. The beam of light includes a spectral wavelength band (color). Each color channel produces a beam of light that includes a different spectral wavelength band and directs the beam of light to the color combining element. The color combining element receives two or more beams of light from different color channels and combines them to form a composite output beam. Each of the two or more beams of light interacts differently with the color combining element and traverses a different path through or from the color combining element. The combining of two or more colors to form a composite output beam may be referred to herein as color mixing, the mixing of colors, color multiplexing, multiplexing or the like.

The color-combining element includes two pieces of solid material. Each piece of solid material is transparent over the spectral band associated with at least one of the color channels. The pieces of solid transparent material may be inorganic or organic materials. The pieces of solid transparent material, for example, may be glass or plastic. The pieces of solid transparent materials may be the same or different composition, the same or different size, or the same or different shape. Each piece of solid transparent material includes one or more coated surfaces and at least one of the pieces of solid transparent material includes two or more coated surfaces. The coatings may include dichroic materials. Each coating is selected to selectively reflect a particular spectral wavelength band (color). Each coating may also be selected to selectively transmit a particular spectral wavelength band. The coatings may include one or more metallic reflective layers, alone or in combination with a dichroic material. In one embodiment, the front surface, one or more interior surfaces, and the back surface of the color combining element are coated with dichroic materials. In another embodiment, the front surface and one or more internal surfaces of the color combining element are coated with dichroic materials and the back surface of the color combining element is coated with a reflective metallic material. As used herein, front surface refers to the initial surface of incidence of the color combining element and back surface refers to the last of a series of surfaces with which light beams originating from light sources of the light multiplexing system interact (through reflection or transmission). The color combining element of the light multiplexing system has one front surface, one back surface, and two or more internal surfaces that are encountered by light beams. As described more fully hereinbelow, not all light beams incident on the color combining element will encounter all of the coated surfaces.

The light multiplexing system is configured so that the beams of light originating from the light sources of the color channels are directed toward and initially incident to a first surface of the color combining element. The first surface has a coating disposed thereon. The beams of light from different color channels may be parallel when incident to the first surface. The light sources of the color channels may be parallel and deliver parallel beams of light to the first surface either directly or through intervening optics. The light sources of the color channels may be non-parallel and produce beams of light that are manipulated with mirrors or other optics to achieve parallel directions of propagation before reaching the coating disposed on the first surface.

The coating disposed on the first surface reflects a beam of light from one color channel and transmits one or more beams of light from one or more other color channels. The transmitted one or more beams of light enter the interior of the first piece of solid transparent material of the color-combining element and propagate therethrough to a second surface thereof. The second surface of the first piece of solid transparent material may be parallel to the first surface of the first piece of solid transparent material. The second surface of the first piece of solid transparent material may be uncoated or may have a coating disposed thereon. If present, the coating disposed on the second surface is formed of a material that reflects one of the beams of light transmitted by the coating disposed on the first surface and transmits other beams of lights transmitted by the coating disposed on the first surface through the second surface. If uncoated, the second surface transmits the beams of light transmitted by the coating disposed on the first surface.

The one or more beams of light transmitted through the second surface exit the first piece of solid transparent material of the color-combining element and propagate toward the second piece of solid transparent material. The second piece of solid transparent material receives the one or more beams transmitted by the second surface at a third surface. The third surface of the second piece of solid transparent material may be parallel to the second surface of the first piece of solid transparent material. The third surface may be uncoated or may have a coating disposed thereon. If present, the coating disposed on the third surface of the second piece of solid transparent material is formed of a material that reflects one of the beams of light transmitted by the second surface and transmits other beams of light transmitted by the second surface. At least one of the second surface and third surface is coated.

The first piece of solid transparent material may or may not be in direct contact with the second piece of solid transparent material. In a first embodiment, the second surface of the first piece of solid transparent material has a coating disposed thereon, the third surface of the second piece of solid transparent material is uncoated, and the first and second pieces of solid transparent material are arranged so that the coating disposed on the second surface is in direct contact with the uncoated third surface. In a second embodiment, the second surface of the first piece of solid transparent material has a coating disposed thereon, the third surface of the second piece of solid transparent material is uncoated, and the first and second pieces of solid transparent material are arranged so that the coating disposed on the second surface is not in direct contact with the uncoated third surface. A gap or filler material, for example, may be present between the coating disposed on the second surface and the uncoated third surface. The filler material may be an optically transparent material such as an optical cement.

In a third embodiment, the second surface of the first piece of solid transparent material is uncoated, the third surface of the second piece of solid transparent material has a coating disposed thereon, and the first and second pieces of solid transparent material are arranged so that the coating disposed on the third surface is in direct contact with the uncoated second surface. In a fourth embodiment, the second surface of the first piece of solid transparent material is uncoated, the third surface of the second piece of solid transparent material has a coating disposed thereon, and the first and second pieces of solid transparent material are arranged so that the coating disposed on the third surface is not in direct contact with the uncoated second surface. A gap or filler material, for example, may be present between the coating disposed on the third surface and the uncoated second surface. The filler material may be an optically transparent material such as an optical cement.

In a fifth embodiment, the second surface of the first piece of solid transparent material has a coating disposed thereon, the third surface of the second piece of solid transparent material has a coating disposed thereon, and the first and second pieces of solid transparent material are arranged so that the coating disposed on the second surface is in direct contact with the coating disposed on the third surface. In a sixth embodiment, the second surface of the first piece of solid transparent material has a coating disposed thereon, the third surface of the second piece of solid transparent material has a coating disposed thereon, and the first and second pieces of solid transparent material are arranged so that the coating disposed on the second surface is not in direct contact with the coating disposed on the third surface. A gap or filler material, for example, may be present between the coating disposed on the second surface and the coating disposed on the third surface. The filler material may be an optically transparent material such as an optical cement.

Beams of light exiting the first piece of solid transparent material that are not reflected by a coating disposed on the third surface of the second piece of solid transparent material transmit through the third surface, enter the second piece of solid transparent material, and propagate therethrough to a fourth surface. The fourth surface of the second piece of solid transparent material may be parallel to the third surface of the second piece of solid transparent material. The fourth surface has a coating disposed thereon. The coating disposed on the fourth surface may be a dichroic material or a reflective metallic material and reflects a beam of light transmitted through the third surface.

The beams of light reflected from the coating disposed on the first surface of the first piece of solid transparent material, the coating disposed on the fourth surface of the second piece of solid transparent material, and the coating(s) disposed on one or both of the second surface of the first piece of solid transparent material or the third surface of the second piece of solid transparent material may be parallel or may be directed along a common optical axis. Beams propagating along a common optical axis may be referred to herein as coaxial beams.

The light sources of the color channels are preferably solid state light sources. Solid state light sources include solid state lasers and solid state LEDs. The active (light-generating) material of the solid state light sources may include one or more semiconductor materials and/or junctions between semiconductor materials. The solid state lasers may include diode lasers. The spectral wavelength bands provided by the solid state light sources may be in the infrared, visible, or ultraviolet. The spectral wavelength bands provided by the solid state light sources may be non-overlapping in wavelength. In one embodiment, the light multiplexing system includes color channels with light sources that provide beams of light having non-overlapping spectral wavelength bands in the visible. The system may include, for example, three light sources that provide beams of light in the red, green and blue portions of the spectrum. In addition to light sources, the color channels may include optics for focusing, collimating, filtering, shaping, or reflecting beams of light produced by the light sources.

Figure 3:
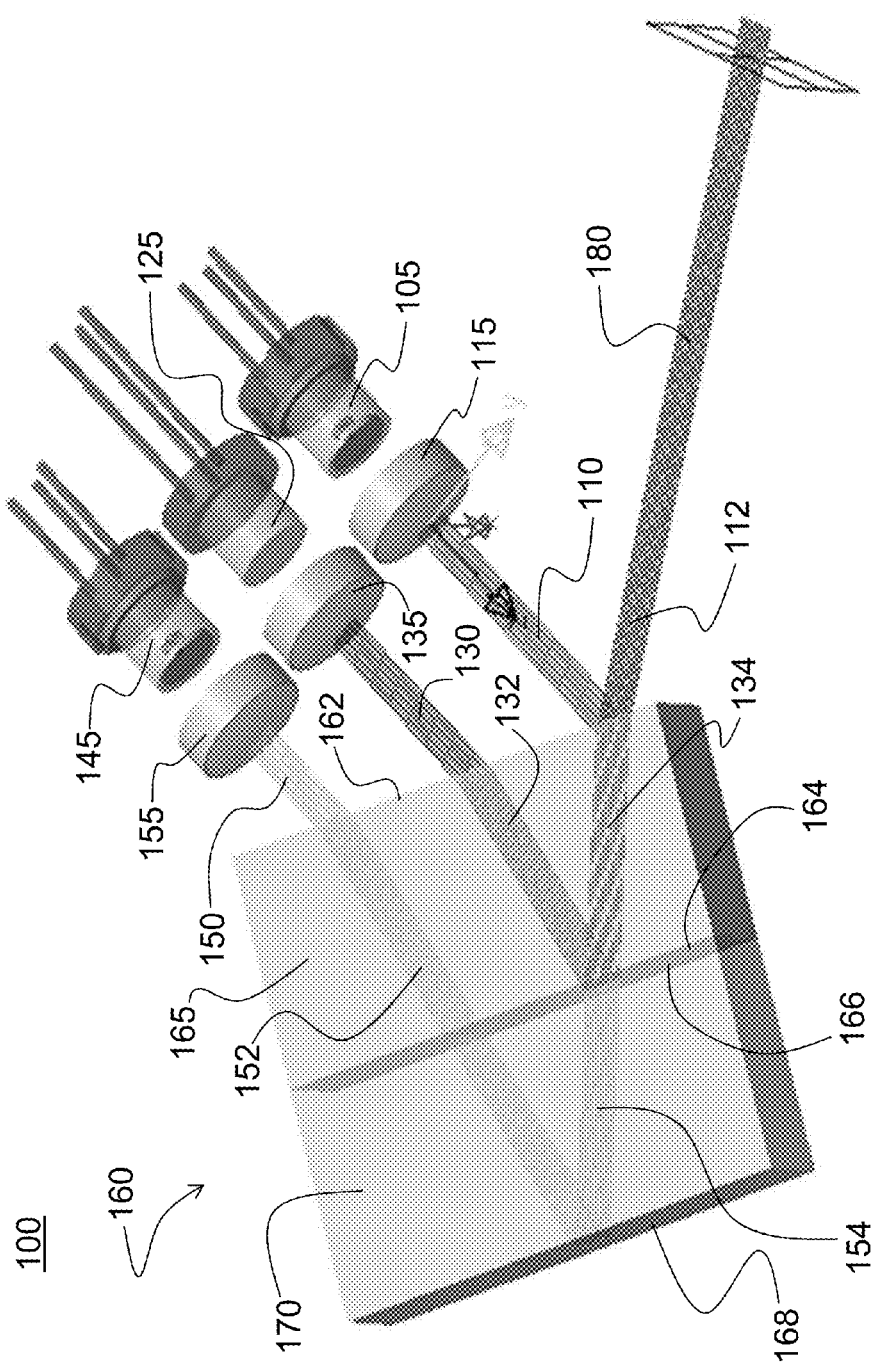
FIG. 3 is a schematic diagram showing a light multiplexing system with a color combining element and three color channels.

An exemplary light multiplexing system in accordance with the present disclosure is depicted in FIG. 3. Light multiplexing system 100 includes color combining element 160 and three color channels. Color combining element 160 includes pieces 165 and 170 of solid transparent material. Color combining element 160 includes front surface 162, back surface 168, and intermediate surfaces 164 and 166. Surfaces 162 and 164 are associated with piece 165 of solid transparent material and surfaces 166 and 168 are associated with piece 170 of solid transparent material. Front surface 162 is parallel to intermediate surface 164. Intermediate surface 166 is parallel to back surface 168. In the embodiment of FIG. 3, pieces 165 and 170 of solid transparent material are configured so that front surface 162 is parallel to back surface 168. In the embodiment of FIG. 3, front surface 162, intermediate surface 164, intermediate surface 166, and back surface 168 are the surfaces of color combining element 160 upon which one or more light beams are incident. Front surface 162, intermediate surface 164, intermediate surface 166, and back surface 168 may be referred to herein as receiving surfaces. Front surface 162 and intermediate surface 164 are non-contiguous surfaces of piece 165 of solid transparent material. Intermediate surface 166 and back surface 168 are non-contiguous surfaces of piece 170 of solid transparent material.

The three color channels include solid state lasers 105, 125, and 145; respectively. A first color channel provides beam of light 110 that passes through collimating lens 115. A second color channel provides beam of light 130 that passes through collimating lens 135. A third color channel provides beam of light 150 that passes through collimating lens 155. In this illustrative example, solid state lasers 105, 125, and 145 provide red, blue, and green output beams, respectively. The range of wavelengths included in red beam 110, blue beam 130, and green beam 150 is determined by the performance of solid state lasers 105, 125, and 145, respectively. For typical solid state lasers, the line width of the output beam is narrow and the spectral intensity is distributed over a narrow wavelength range. In the embodiment of FIG. 3, the spectral wavelength bands produced by solid states lasers 105, 125, and 145 are non-overlapping.

Front surface 162 and back surface 168 have dichroic coatings disposed thereon. Back surface 168 may alternatively have a metallic coating disposed thereon. In the embodiment of FIG. 3, a third coating is disposed between and in contact with intermediate surfaces 164 and 166. Pieces 165 and 170 of solid transparent material are in contact with each other via the intervening third coating. The third coating may initially be disposed on either surface 164 or surface 166 before assembling pieces 165 and 170 to form color combining element 160.

The color channels direct red beam 110, blue beam 130, and green beam 150 to front surface 162. Red beam 110, blue beam 130, and green beam 150 are parallel when incident on front surface 162. The coating disposed on front surface 162 reflects red beam 110, transmits blue beam 130, and transmits green beam 150. Reflected red beam 112 becomes a component of output beam 180. Transmitted blue beam 132 and transmitted green beam 152 enter piece 165 of solid transparent material and propagate to the coating disposed between intermediate surfaces 164 and 166. The coating disposed between intermediate surfaces 164 and 166 reflects blue beam 132 and transmits green beam 152. Reflected blue beam 134 returns through piece 165 of solid transparent material, passes through the coating disposed on front surface 162, and combines with reflected red beam 112 to become a second component of output beam 180. Transmitted green beam 152 enters piece 170 of solid transparent material and propagates to the coating disposed on back surface 168. The coating disposed on back surface 168 reflects green beam 152. Reflected green beam 154 returns through piece 170 of solid transparent material, propagates through the coating disposed between intermediate surfaces 164 and 166, enters piece 165 of solid transparent material, passes through the coating disposed on front surface 162, and combines with reflected blue beam 134 and reflected red beam 112 to become a third component of output beam 180. Reflected green beam 154, reflected blue beam 134, and reflected red beam 112 combine coaxially to form output beam 180.

The embodiment of FIG. 3 illustrates mixing of three colors provided by three color channels to provide a coaxial output beam that includes each of the three colors. The general principles indicated for the embodiment of FIG. 3 extend to light multiplexing systems having two or more color channels that deliver two or more non-overlapping spectral wavelength bands. The number of pieces of solid transparent material needed to mix n colors may be n−1 and the number of coated surfaces needed to mix n colors may be n. For example, mixing of four colors may be achieved with a color combining element that includes three pieces of solid transparent material that includes four noncontiguous coated surfaces. The materials for the pieces of solid transparent material used to form the color combining element and the dichroic materials used to form the coatings can be selected to selectively reflect and transmit wavelength bands in the infrared, visible, and ultraviolet portions of the spectrum.

Figure 4A:
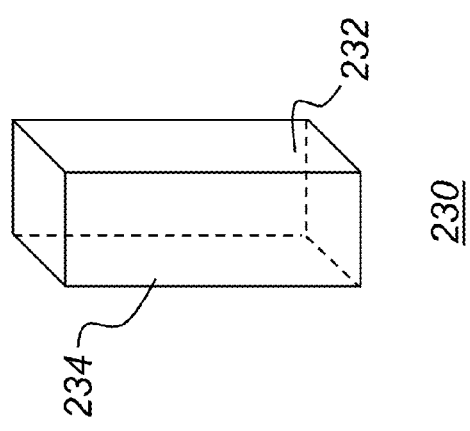
FIG. 4A is a perspective view showing a color combiner element with parallel coated surfaces according to an embodiment of the present invention.
Figure 4B:
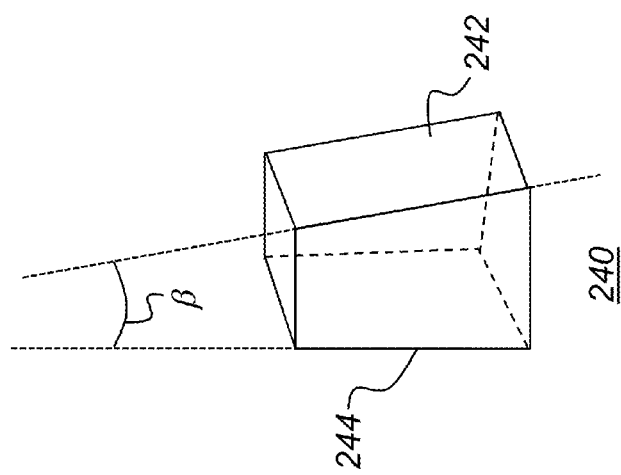
FIG. 4B is a perspective view showing a color combiner element with oblique coated surfaces according to an embodiment of the present invention.

As indicated hereinabove, the non-contiguous receiving surfaces of either or both pieces of solid transparent material that form the color combining element may be parallel or non-parallel. FIG. 4A depicts a piece of solid transparent material 230 having parallel receiving surfaces 232 and 234. FIG. 4B depicts a piece of solid transparent material 240 having receiving surfaces 242 and 244 that are non-parallel and obliquely disposed with respect to each other at a wedge angle β. The color combining element may include two pieces of solid transparent material of the type shown in FIG. 4A, or two pieces of solid transparent material of the type shown in FIG. 4B, or one piece of solid transparent material of the type shown in FIG. 4A and one piece of solid transparent material of the type shown in FIG. 4B. The cross-sectional shape of the pieces of solid transparent material taken orthogonal to the optical axis (such as a cross-section taken in parallel to a receiving surface) may be rectangular, cylindrical, hexagonal, or other suitable shape.

Figure 5:
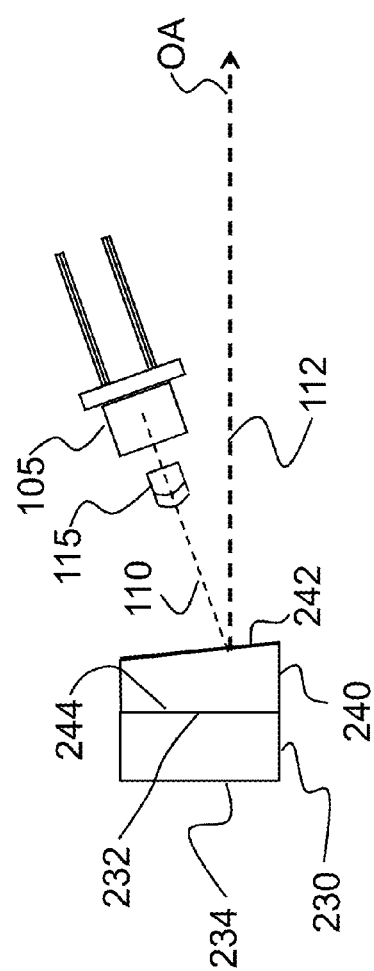
FIG. 5 is a schematic diagram showing the path of light in the red color channel for an embodiment of the color combining element having an angled front receiving surface.
Figure 6:
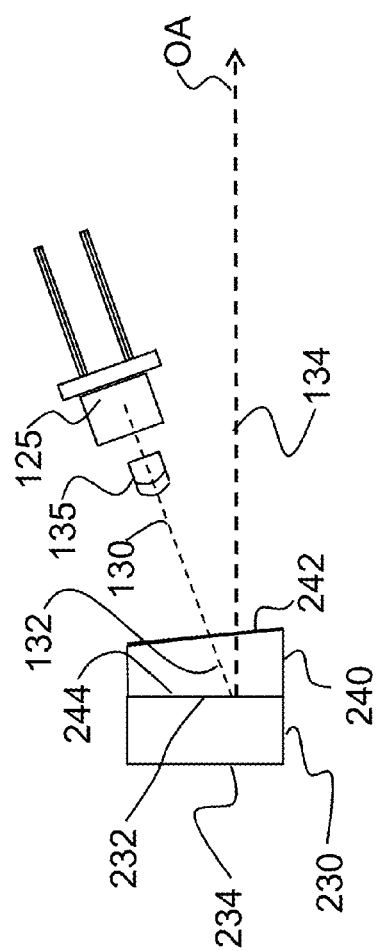
FIG. 6 is a schematic diagram showing the path of light in the blue color channel for an embodiment of the color combining element having an angled front receiving surface.
Figure 7:
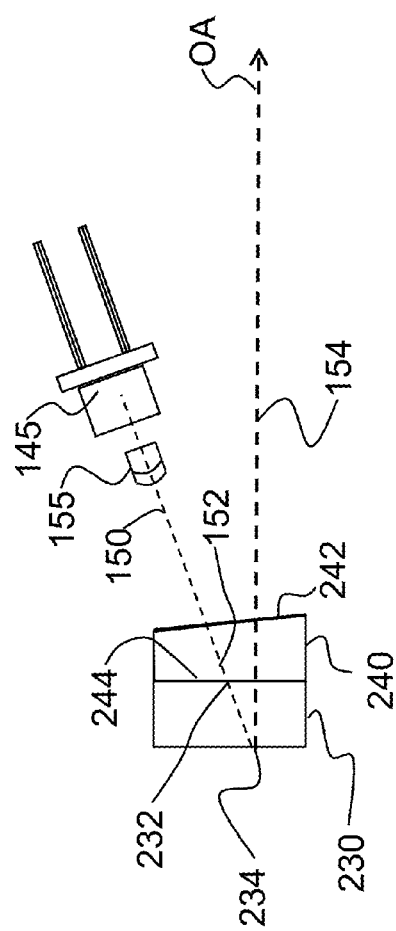
FIG. 7 is a schematic diagram showing the path of light in the green color channel for an embodiment of the color combining element having an angled front receiving surface.

FIG. 5 depicts a color combining element that includes piece 230 of solid transparent material shown in FIG. 4A and piece 240 of solid transparent material shown in FIG. 4B, where surfaces 232 and 244 are in direct contact. Surface 242, one of surfaces 232 and 244, and surface 234 are coated with a dichroic material. The color combining element is configured such that surface 242, slanted as indicated by wedge angle β shown in FIG. 4B, is the front receiving surface. FIG. 5 depicts the incidence of red beam 110 from the red color channel of the embodiment of FIG. 3 onto receiving surface 242 of piece 240 of solid transparent material and reflection of reflected red beam 112 onto optical axis OA. FIG. 6 depicts the incidence of blue beam 130 from the blue color channel of the embodiment of FIG. 3 onto receiving surface 242 of piece 240 of solid transparent material. The coating disposed on receiving surface 242 is selected to reflect red light and transmit blue light and green light. Transmitted blue beam 132 passes through piece 240 of solid transparent material and is reflected by a coating disposed on either surface 232 or 244. Reflected blue beam 134 is directed along optical axis OA. FIG. 7 depicts the incidence of green beam 150 from the green color channel of the embodiment of FIG. 3 onto receiving surface 242 of piece 240 of solid transparent material. The coating disposed on receiving surface 242 is selected to reflect red light and transmit blue light and green light. The coating disposed on one of surfaces 232 or 244 is selected to reflect blue light and to transmit green light. Transmitted green beam 152 passes through piece 230 of solid transparent material and is reflected by a coating disposed on surface 234. Reflected green beam 134 is directed along optical axis OA.

The color combining element of the present invention permits positioning of light sources such that the angle of incidence of optical beams from each of the light sources is low. As used herein, the angle of incidence refers to the angle between the direction of incidence of the optical beam and the normal to surface upon which the light beam is incident. Low angles of incidence are beneficial because they reduce the wavelength dependence of light transmitted or reflected from dichroic coatings as well as effects of dichroic coatings on the polarization state of reflected light. Typically, dichroic coatings are designed to transmit p-polarized light, having its transmission axis parallel to the plane of incidence, and to reflect orthogonally polarized s-polarized light. This characteristic presents a problem with a color combiner wherein some colors are reflected and others transmitted from the dichroic surfaces. Orthogonal polarization axes are a problem, for example, when illumination is provided to an LCoS device that modulates light by selectively changing the polarization state of individual pixels. In conventional imaging apparatus, a wave plate must be used to correct for this condition. With embodiments of the instant color combining element, the low incidence angles at dichroic surface reduces differences in dichroic response due to polarization. The angle of incidence may be less than 20 degrees, or less than 10 degrees, or less than 5 degrees. For angled receiving surfaces, the angle of incidence may also be less than the wedge angle β.

Figure 8:
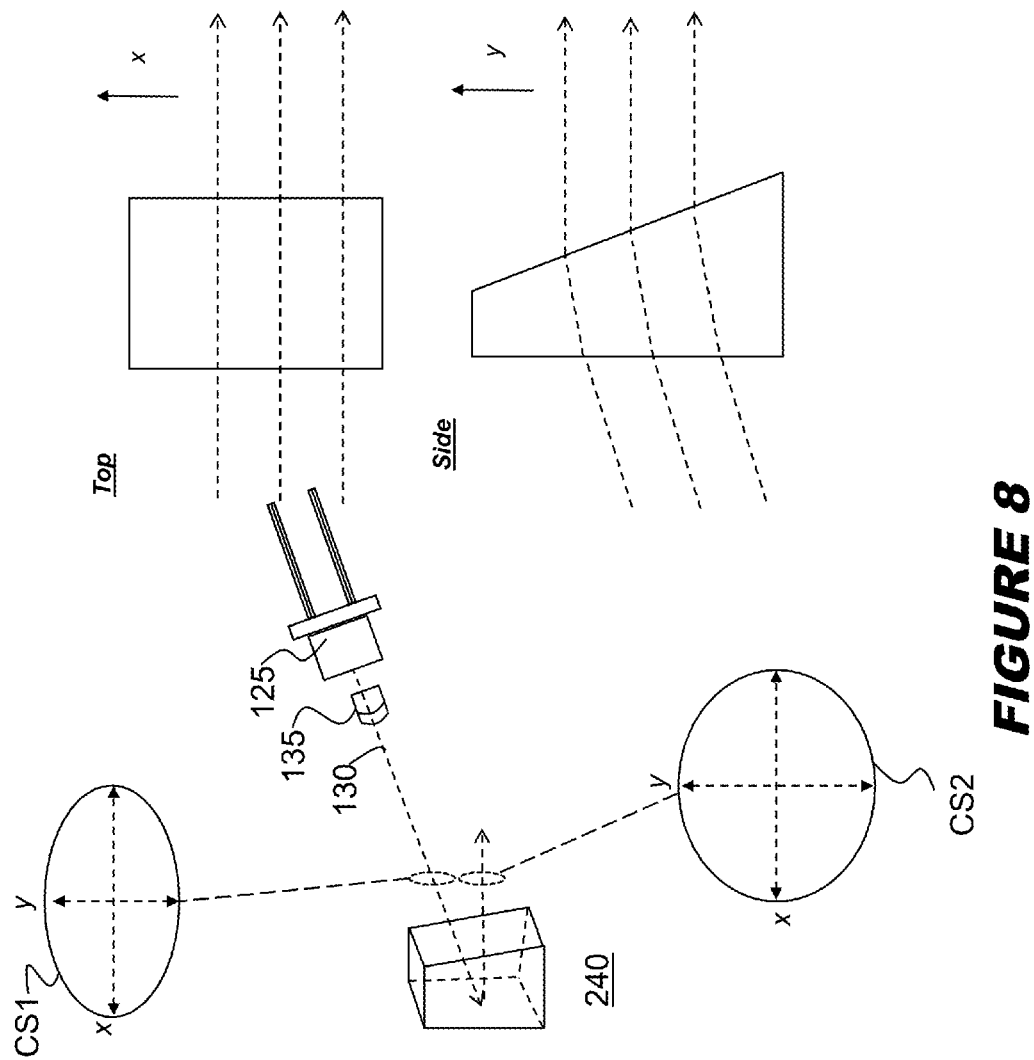
FIG. 8 is a schematic diagram that shows orientation of a laser beam relative to a piece of the color combining element for compensating beam anamorphism.

The divergence of solid state lasers is usually anamorphic, longer along one axis than along the orthogonal axis. FIG. 8, for example, shows a cross-sectional view of the elliptical beam profile CS1 as it emerges from blue laser light source 125 and collimating lens 135 of the blue color channel of the embodiment of FIG. 3. Beam profile CS1 has a low-divergence angle in the y direction (vertical in this example) and a high-divergence angle in the x direction. Preferably, this laser beam is oriented so that its low divergence angle (y direction) lies substantially in the plane of the wedge angle β of piece 240 of solid transparent material of the color combining element shown in FIGS. 5-7, vertical in the example shown. Side and top cross-section views of piece 240 of solid transparent material of the color combining element are shown, with the light beam path represented, exaggerated with respect to height and width dimensions. The vertical or y component of the light beam "sees" the wedge-shaped refractive structure, which correspondingly stretches the beam in the vertical direction. The orthogonal horizontal or x component of the light beam passes through piece 240 of solid transparent material of the color combining element without encountering appreciable refraction in this direction, as shown in the top view cross-section. The resulting beam profile CS2 is more symmetrical or circular as a result.

The coaxial beam of mixed colors is oriented along optical axis OA and may be further directed to optics, modulators, or other beam shaping or beam manipulating elements to provide an output beam. The output beam may be directed to a display. In one embodiment, the coaxial beam is directed to a light modulator, such as a scanner, which may modulate beam intensity. The scanner may be actuatable to form successive lines of pixels and direct the light toward a display surface. Each pixel may be written individually and may be formed as a combination of primary component red, green, and blue color light. To provide high-speed pixel generation, each solid-state light source (e.g. 105, 125, and 145) in its respective color channel may have a corresponding laser driver that operates synchronously with the scanner. An exemplary high-speed pixel generation and scanning timing pattern is used, for example, in the Pico Projector Display from Microvision Inc., Redmond, Wash., USA, for example.

The coaxial output beam may be directed to a spatial light modulator to form images for projection. Examples of spatial light modulators include digital micromirror arrays or other micro-electro-mechanical imaging array devices that, when actuated, modulates light using reflection or diffraction, including various types of electromechanical grating light modulators, or a polarization modulating device such as a liquid crystal device. A light integrator element (e.g. a fly's-eye integrator, an integrator bar, or other suitable type of light homogenizer) may be used to provide a uniform beam of light for modulation. A lens may be used to direct light from along the optical axis, one color at a time, to the light integrator element for forming an image in a color-sequential arrangement. Here, the function of the color combining element may be to direct each solid-state light source, one at a time, to the spatial light modulator through the light integrator element. A projection lens may be used to direct light toward a display surface.

The light multiplexing system may further include sensors for measuring output power of the light sources. The sensors may be integrated with control electronics to stabilize the output power of the light sources. Sensors may be affixed to one or both pieces of solid transparent material at a location that does not interfere with the optical path of incident, transmitted or reflected optical beams. Sensors may be affixed, for example, to non-coated surfaces of one or both pieces of solid transparent material of the instant color combining device. Sensors may measure power by detecting stray or imperfectly reflected light. Power may be measured for each light source included in the light multiplexing system.

The pieces of solid transparent material used for the present color combining element is selected based on a number of factors, including cost, index of refraction, and suitability for coating. The index of refraction of the material is important as it relates to the incident angles of light from the laser sources. The index of refraction of the material, for example, is a factor in the angular positioning of solid-state light sources.

Surfaces of the pieces of solid transparent material that are coated with dichroic materials are flat. Because light from the light sources is not incident on the other uncoated surfaces of color combining element, the other surfaces of this element can be other than flat, such as having some amount of curvature or other shape, which might be useful in packaging or mounting, for example. Ground glass surfaces are acceptable in some embodiments The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, although the description hereinabove is primarily directed to laser diodes, the color combining element of the present invention could be utilized with other color light sources, including other laser types and with solid-state light sources that are energizable to emit light of suitable wavelength bands for imaging or other function that requires light combination. Arrays with multiple light emitters could be used. In general, this approach would work best with a source that provides well-collimated light with a narrow beam width. While the present color combining element is described for mixing illumination that may not be modulated by a spatial light modulator prior to its incidence at the front receiving surface of the color combiner, this approach could alternately be used for combining light that has already been modulated in each color channel using a separate modulator array. However, there may be some practical constraints for combining modulated light, other than for light modulated using direct laser modulation as described earlier, since distortion within each color channel may differ significantly. It should also be noted that the exemplary embodiments shown describe red, green, and blue color channels and show particular arrangements of dichroic surfaces that are fabricated to transmit or reflect particular colors. These examples, however, are intended to describe particular embodiments and are non-limiting; other color combinations for dichroic surface behavior could be used, for example, interchanging color designations in various figures and allowing different arrangements of colors reflected or transmitted, or different wavelength bands other than conventional red, green, and blue wavelength bands.

Thus, what is provided is an apparatus and method for combining light of first, second, and third wavelength bands in an imaging apparatus.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A light multiplexing system comprising:
   a color-combining element, said color-combining element comprising:
      a first piece of solid transparent material, said first piece of solid transparent material having a first surface parallel to a second surface, said color combining element having an exterior surface, said exterior surface including said first surface;
      a second piece of solid transparent material, said second piece of solid transparent material having a third surface and a fourth surface;
      a first coating disposed on said first surface;
      a second coating disposed on said second surface or said third surface; and
      a third coating disposed on said fourth surface;
   a first color channel having a first light source, said first color channel directing a first beam of light onto said first coating, said first beam of light including a first wavelength band;
   a second color channel having a second light source, said second color channel directing a second beam of light onto said first coating, said second beam of light including a second wavelength band and being parallel to said first beam of light at said first coating;
   a third color channel having a third light source, said third color channel directing a third beam of light onto said first coating, said third beam of light including a third wavelength band and being parallel to said second beam of light at said first coating;
   wherein said first coating reflects said first wavelength band and transmits said second wavelength band and said third wavelength band;
   wherein said second coating reflects said second wavelength band and transmits said third wavelength band; and
   wherein said third coating reflects said third wavelength band.

2. The light multiplexing system of claim 1, wherein said second coating is in direct contact with said second surface and said third surface.

3. The light multiplexing system of claim 1, wherein said first piece of transparent material and said second piece of transparent material comprise glass or plastic.

4. The light multiplexing system of claim 1, wherein a first of said first beam of light, said second beam of light and said third beam of light includes red light; wherein a second of said first beam of light, said second beam of light and said third beam of light includes blue light; wherein a third of said first beam of light, said second beam of light and said third beam of light includes green wavelengths.

5. The light multiplexing system of claim 4, wherein said first beam of light includes red light, said second beam of light includes blue light, and said third beam of light includes green light.

6. The light multiplexing system of claim 1, wherein the wavelength ranges of said first wavelength band, said second wavelength band, and said third wavelength band are non-overlapping.

7. The light multiplexing system of claim 1, wherein said first light source, said second light source and said third light source are parallel.

8. The light multiplexing system of claim 1, wherein said first light source, said second light source, and said third light source are solid state light sources.

9. The light multiplexing system of claim 1, wherein said reflected first wavelength band, said reflected second wavelength band, and said reflected third wavelength band are coaxial.

10. The light multiplexing system of claim 1, wherein said second coating is disposed on said second surface.

11. The light multiplexing system of claim 1, wherein said third surface and said fourth surface are parallel.

12. The light multiplexing system of claim 1, wherein said first surface and said fourth surface are parallel.

13. The light multiplexing system of claim 1, further comprising a light integrator disposed to receive said reflected first wavelength band, said reflected second wavelength band, and said reflected third wavelength band.

14. The light multiplexing system of claim 1, further comprising projection optics disposed to direct said reflected first wavelength band, said reflected second wavelength band, and said reflected third wavelength band to a display surface.

15. The light multiplexing system of claim 1, further comprising a light modulator disposed to receive said reflected first wavelength band, said reflected second wavelength band, and said reflected third wavelength band.

16. The light multiplexing system of claim 15, wherein said light modulator is selected from the group consisting of a digital micromirror array, a liquid crystal device, and a scanner.

17. The light multiplexing system of claim 1, wherein said first piece of solid transparent material and said second piece of solid transparent material are separated by a gap.

18. The light multiplexing system of claim 17, wherein said gap is filled with an optically transparent material.

19. The light multiplexing system of claim 1, wherein said third coating comprises a reflective metallic material.

20. The light multiplexing system of claim 1, wherein said first piece of solid transparent material and said second piece of solid transparent material are rectangular.

21. The light multiplexing system of claim 1, wherein said second coating reflects said second wavelength band to said first surface.

22. The light multiplexing system of claim 1, wherein said third coating reflects said third wavelength band to said first surface.

23. The light multiplexing system of claim 22, wherein said third coating reflects said third wavelength band to said second surface.

24. The light multiplexing system of claim 1, wherein said first beam of light, said second beam of light, and said third beam of light are collimated at said first coating.

25. The light multiplexing system of claim 1, wherein said first color channel comprises a first collimating lens coupled to said first light source, said second color channel comprises a second collimating lens coupled to said second light source, and said third color channel comprises a third collimating lens coupled to said third light source.

26. The light multiplexing system of claim 1, wherein said reflected first wavelength band, said reflected second wavelength band, and said reflected third wavelength band are coaxial.

27. The light multiplexing system of claim 1,
wherein said second color channel has a first output, said second wavelength band traversing a first path having a first length, said first length extending from said first output through said color-combining element to a position of emergence of an output beam from said color-combining element; and
wherein said third color channel has a second output, said third wavelength band traversing a second path having a second length, said second length extending from said second output through said color-combining element to said position of emergence of an output beam from said color-combining element; and
wherein said first length differs from said second length.

* * * * *